US007461704B2

(12) United States Patent
Chen

(10) Patent No.: US 7,461,704 B2
(45) Date of Patent: Dec. 9, 2008

(54) AIRFLOW CONTROL STRUCTURE FOR PNEUMATIC TOOLS

(75) Inventor: Lung-Pao Chen, Hsinchu County (TW)

(73) Assignee: Sunmatch Industrial Co., Ltd., Hsinchu County (TW)

( * ) Notice: Subject to any disclaimer, the term of this patent is extended or adjusted under 35 U.S.C. 154(b) by 0 days.

(21) Appl. No.: 11/723,326

(22) Filed: Mar. 19, 2007

(65) Prior Publication Data

US 2008/0230247 A1 Sep. 25, 2008

(51) Int. Cl.
*B23B 45/04* (2006.01)

(52) U.S. Cl. ........................ 173/169; 173/93; 173/93.5; 173/221

(58) Field of Classification Search ................. 173/168, 173/169, 93, 93.5, 221, 218, 104, 109
See application file for complete search history.

(56) References Cited

U.S. PATENT DOCUMENTS 3,666,027 A * 5/1972 Sauerwein et al. .......... 173/169
3,833,068 A * 9/1974 Hall ........................... 173/169
5,918,686 A * 7/1999 Izumisawa ................... 173/20
5,924,497 A * 7/1999 Spooner et al. ............. 173/169
6,634,438 B1 * 10/2003 Pusateri et al. ................. 173/1
6,883,619 B1 * 4/2005 Huang ........................ 173/93.5
7,311,155 B2 * 12/2007 Chang ........................ 173/104

FOREIGN PATENT DOCUMENTS

TW 569885 1/2004

* cited by examiner

*Primary Examiner*—Scott A. Smith
(74) *Attorney, Agent, or Firm*—Muncy, Geissler, Olds & Lowe, PLLC

(57) ABSTRACT

The improved airflow control structure for pneumatic tools has an air inlet to receive external air, a cylinder located in a pneumatic tool and an air intake passage located between them. A valve bushing is provided to connect to the air intake passage and respectively connect a first air intake flow path and a second air intake flow path. The valve bushing holds a control bar which can alter the air intake flow path of the pneumatic tool to control the rotation of pneumatic tool in a positive direction or a reverse direction. As the valve bushing and the cylinder are integrally formed in one piece, the pneumatic tool can be adopted in a plastic housing. Through the control bar users can operate the pneumatic tool single-handed as convenient as to start, stop or regulate the pneumatic tool in positive or reverse rotations while using the same hand to hold it.

3 Claims, 4 Drawing Sheets

AIRFLOW CONTROL STRUCTURE FOR PNEUMATIC TOOLS

FIELD OF THE INVENTION

This invention relates to an improvement of airflow control structure for pneumatic tools and particularly to a structure that has a valve bushing and a cylinder formed in an integrated manner to be used on the pneumatic tools with a plastic housing.

BACKGROUND OF THE INVENTION

In general, a pneumatic tool is capable to perform various kinds of operations as while its pneumatic motor is driven by the compressed air. The pneumatic motor is able to rotate in a positive direction or a reverse direction by controlling airflow direction of the compressed air. Reference may be made to R.O.C. utility model publication No. 569885 entitled “Improved structure for airflow controlling mechanisms” provided an improvement of airflow controlling mechanism. It comprises a pneumatic cylinder having a cylinder body, an air chamber being formed in the cylinder body, a forward and a backward vents respectively passing through one end of the cylinder body for communicating the air chamber with outer side; an air valve having an annular body section, one end face of the air valve abutting against one end face of the cylinder body, two extension vents respectively extending through the body section, the openings of two ends of each extension vent being respectively positioned one end face of the body section and an inner circumference of the body section, the openings of the two extension vents positioned on the end face of the body section respectively communicating with the forward and backward vents; and an adjustment member having a base section coaxially accommodated in the body section, whereby the adjustment member can be turned between a clockwise position and a counterclockwise position, the circumference of the base section abutting against the inner circumference of the body section, an air passage radially extending through the base section, an opening of one end of the air passage being an outlet formed on the circumference of the base section for communicating with the air passage and a corresponding extension vent.

In the cited reference mentioned above, the compressed air passes through the air passage of the regulator, and enters the air vent of the positive direction through the extended air vents. As the pressure of compressed air is higher than the atmosphere pressure, the compressed air forms a pressure evening process in normal conditions with the lower ambient pressure and generates airflow to form an airflow kinetic force. The pneumatic tool employs this principle and the airflow kinetic force to drive a motor set. However, the question of the above conventional tools is that the regulator for controlling the positive and reverse rotations is located at the rear end of the pneumatic tool body. During operation users cannot control and alter the positive and reverse rotation easily by one hand. This causes a lot of inconveniences for the users in operation as they frequently need to hold the pneumatic tool and a work piece with two hands. The operation efficiency of the pneumatic tool also decreases.

The Applicant had filed an application with an air intake flow path control structure for pneumatic tools that allows users to operate single-handed, in this way they can hold a pneumatic tool at the mean time to start, stop or regulate the tool in positive or reverse rotations by one hand. The regulator for controlling the positive and reverse rotations of the pneumatic tools is located below the pneumatic tool body.

Through a fastening element, the regulator is fastened to the cylinder. But the fastening element might has doubts with possibility of being loosened caused by vibration occurred and could result in leaking of the compressed air during operation of the pneumatic tools.

Hence, how to effectively transport the compressed air for users to facilitate control of positive and reverse rotation of the pneumatic tool and prevent the cylinder and the regulator from separating at the mean time is the goal for the applicants in this field to reach and issues remained to be overcome in the industry.

This invention aims to provide a novel design for pneumatic tools to allow users to operate single-handed, in this way they can hold a pneumatic tool at the mean time to start, stop or regulate the tool in positive or reverse rotations by one hand. Separation of the cylinder and the regulator also can be prevented. Operation convenience can be greatly improved as well.

SUMMARY OF THE INVENTION

It is an object of the present invention to improve operation convenience of pneumatic tools so as to allow users to operate single-handed. By using one hand to hold a pneumatic tool, a user can also use the same hand to start, stop or regulate the tool in positive or reverse rotations at the mean time. It is adaptable to pneumatic tools that have a plastic housing.

It is another object of the invention to have a valve bushing and a cylinder formed in an integrated manner to reduce manufacturing cost and time. Besides, it can prevent the fastening element being loosen caused by vibration generated during operation and the possibility of leaking compressed air.

To achieve the foregoing objects, the invention provides an embodiment which includes an air inlet to receive input of external air, a cylinder located in the pneumatic tool, an air intake passage located between the cylinder and air inlet is connected to a valve bushing which is formed integrally with the cylinder, the valve bushing being connected to a first air intake flow path and a second air intake flow path, and a valve control bar running through the valve bushing that comprises a interceptor, two air passing channels located at two sides of the interceptor to allow air passing through. The control bar can be selectively moved to the first position to make the air intake passage connected with the first air passing channel and the first air intake flow path, the control bar can also be moved to the second position to make the air intake passage connected with the second air passing channel and the second air intake flow path.

The foregoing, as well as additional objects, features and advantages of this invention will be more readily apparent from the following detailed description, which proceeds with reference to the accompanying drawings.

DETAILED DESCRIPTION OF THE PREFERRED EMBODIMENT

Figure 1:
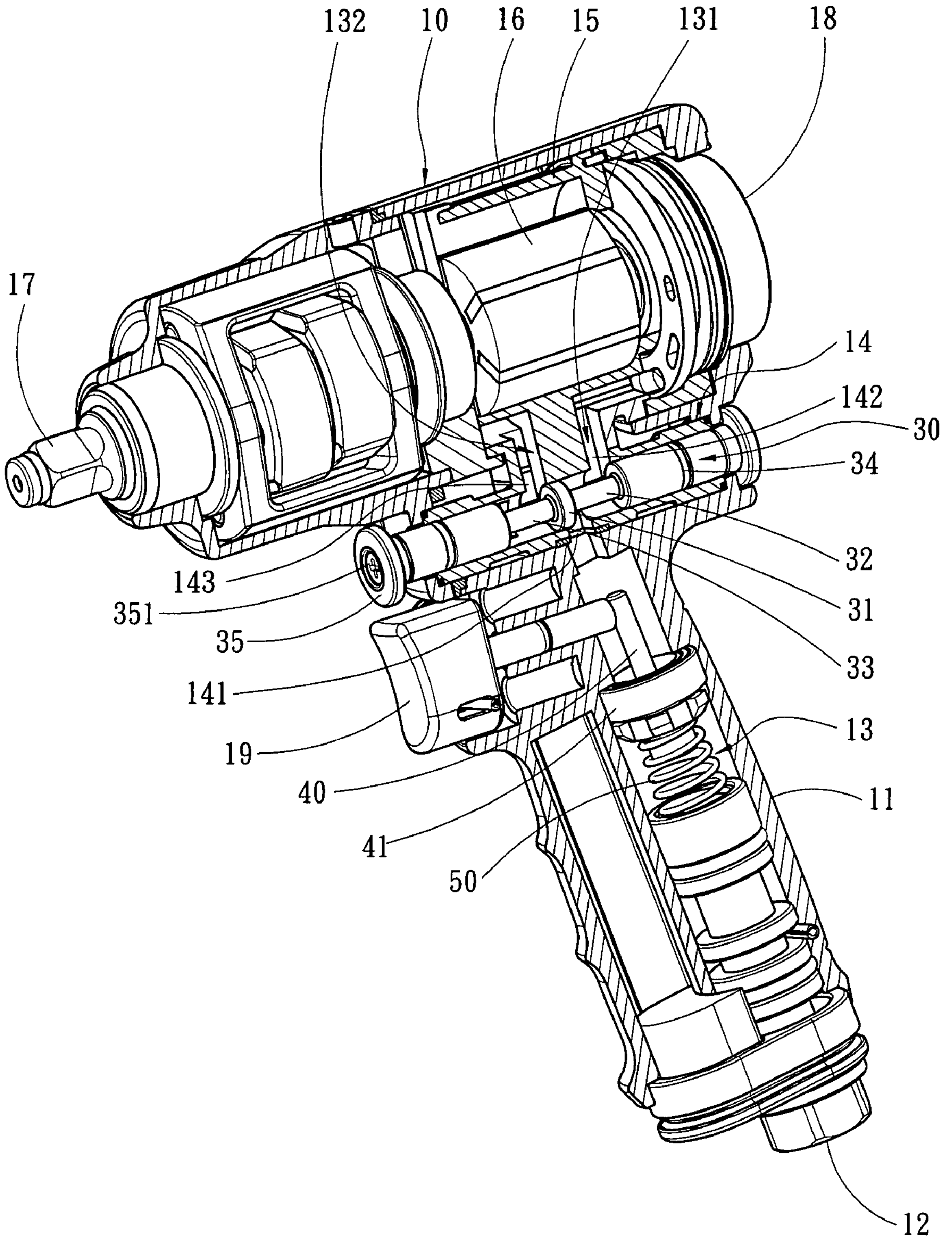
FIG. 1 is a schematic view of an embodiment of the invention.

Please refer to FIG. 1 for an embodiment of the invention. It includes a pneumatic tool 10. The pneumatic tool 10 has a handle 11 and an air inlet 12 located at a lower end of the handle 11 to receive compressed air from outside.

A cylinder 15 located in the pneumatic tool 10. An air intake passage 13 locates between the air inlet 12 and the cylinder 15. The air intake passage 13 is connected to a valve bushing 14 which is integrally formed with the cylinder 15. The valve bushing 14 has a plurality of vents 141, 142 and 143 to connect respectively to the air intake passage 13 and a first air intake flow path 131 and a second air intake flow path 132. The first air intake flow path 131 and the second air intake flow path 132 connect with the cylinder 15, and are respectively the airflow paths of positive and reverse rotation for the cylinder 15. Through different air intake directions, the rotation direction of a rotor 16 in the cylinder 15 can be controlled and altered. And a transmission shaft 17 is driven to rotate in the positive or reverse direction. There is an air volume knob 18 at a rear end of the pneumatic tool 10 connecting to the cylinder 15 to control air intake amount to adjust the rotation speed of the rotor 16 and the transmission shaft 17.

A control bar 30 runs through the valve bushing 14. Both the valve bushing 14 and the control bar 30 are located below the cylinder 15 in a parallel manner. The control bar 30 has an interceptor 31 with an outer diameter same as the inner diameter of the valve bushing 14. The control bar 30 has a sealing ring 34 to form a closed contact with the inner wall of the valve bushing 14 to prevent the compressed air from leaking, and a first air passing channel 32 and a second air passing channel 33 at two sides of the interceptor 31 to allow the air passing through. The control bar 30 further has a detent portion 35 at two ends exposed to outside of the valve bushing 14. The detent portion 35 is fastened on the control bar 30 through a fastening element 351.

Figure 2:
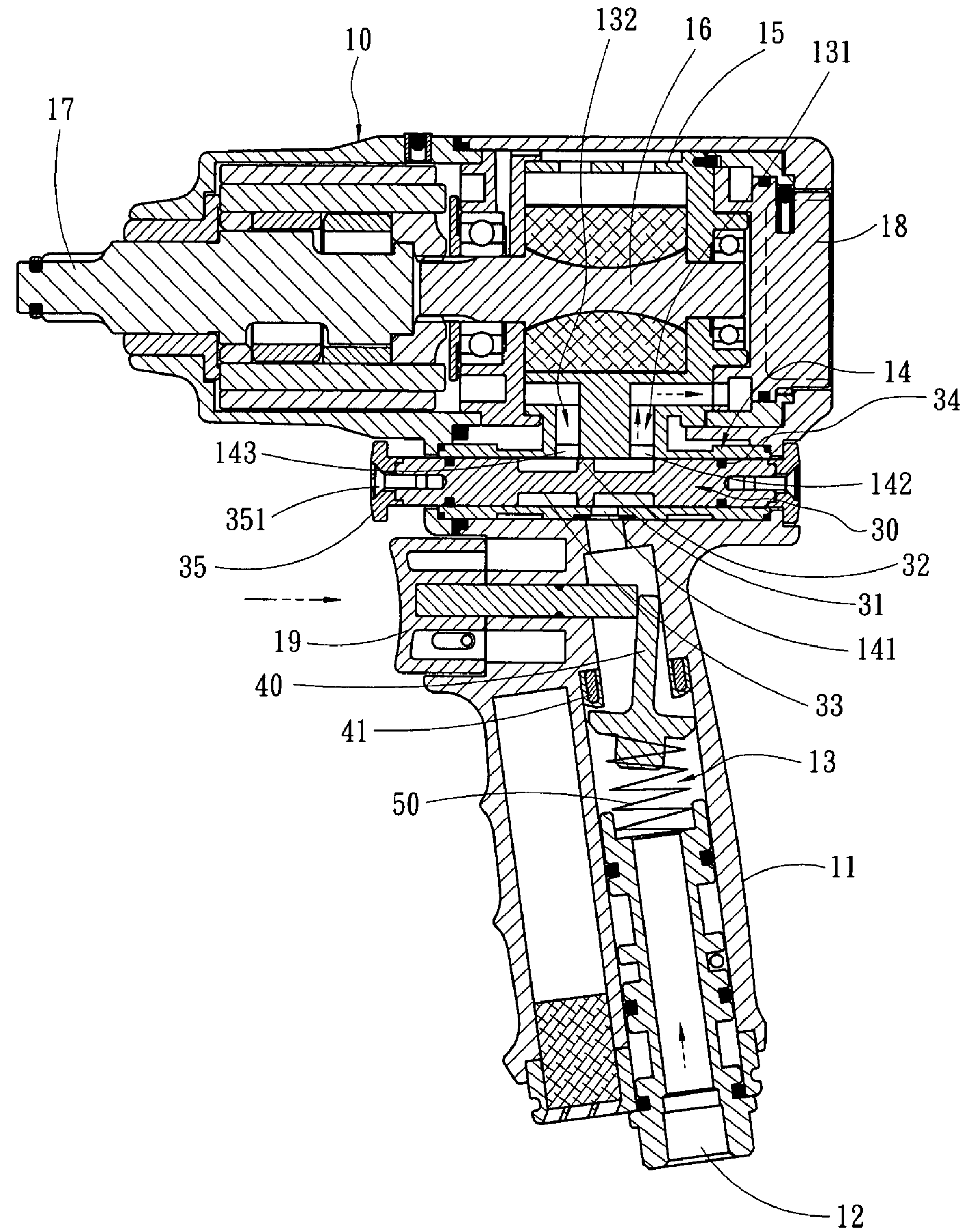
FIG. 2 is a sectional view of an embodiment of the invention.
Figure 3:
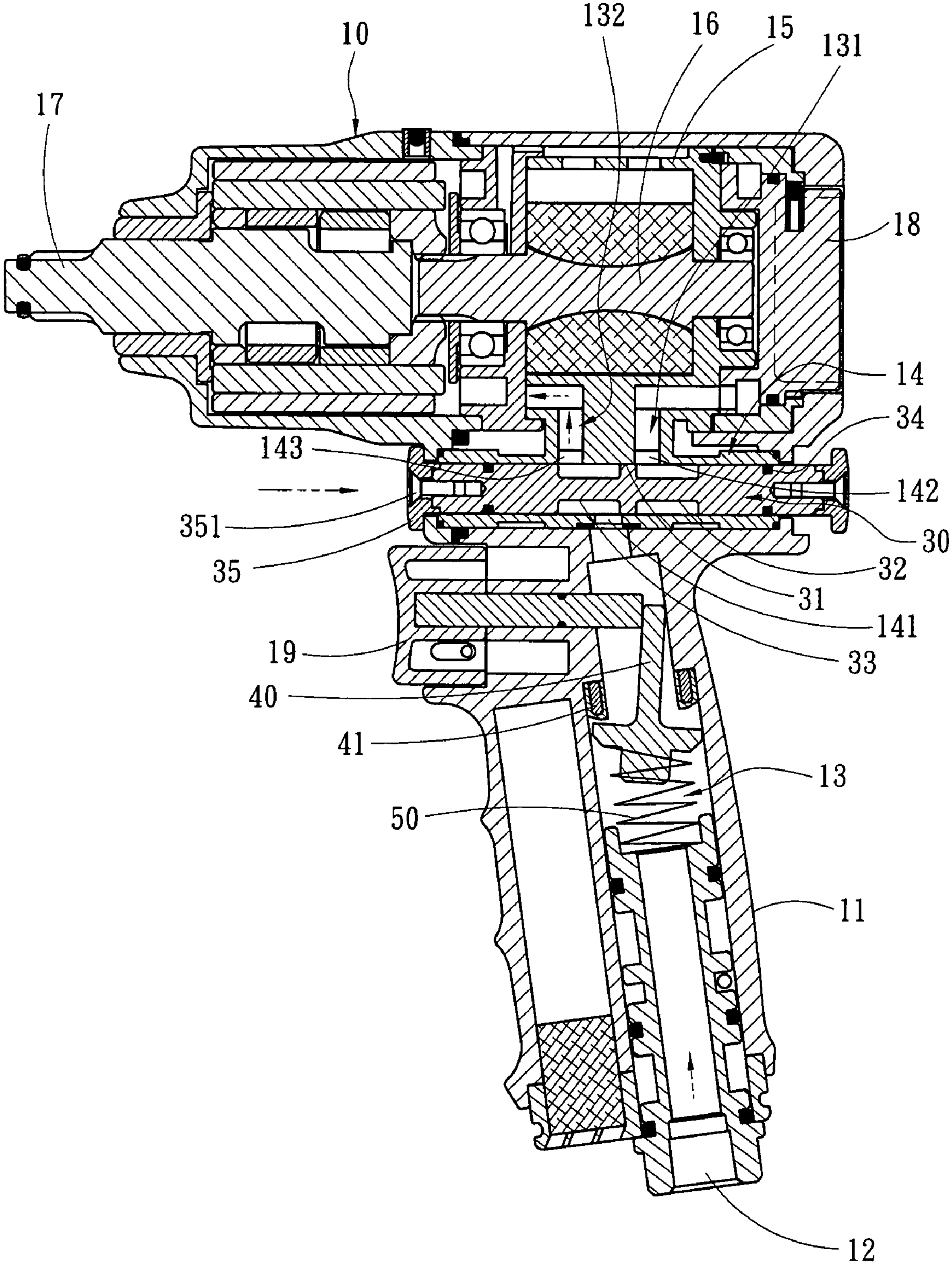
FIG. 3 is another sectional view of an embodiment of the invention.

Refer to FIGS. 2 and 3 for sectional views of the embodiment of the invention. The air intake passage 13 has a bucking bar 40 inside. The lower end of bucking bar 40 is coupling with a spring 50. In normal conditions the bucking bar 40 is pushed by the spring 50 in contact with a washer 41 located thereon so that the compressed air cannot pass through and therefore the pneumatic tool 10 can not be driven. When a trigger 19 at the front side of the handle 11 receives a pressing force from a user, the bucking bar 40 is driven by the trigger 19 and tilted at an angle to allow the compressed air to pass through. The control bar 30 in the valve bushing 14 can be selectively moved by the user by applying a force on the detent portion 35 to a first position (referring to FIG. 2) where the air intake passage 13 is coupled with the first air passing channel 32 and the first air intake flow path 131, and to a second position (referring to FIG. 3) where the air intake passage 13 is coupled with the second air passing channel 33 and the second air intake flow path 132. Through blocking by the interceptor 31, the compressed air can enter only through the first air intake flow path 131 or the second air intake flow path 132 at a given time. Thus the control bar 30 can change the air intake flow path of the pneumatic tool 10 to control the positive and reverse rotation thereof.

Figure 4:
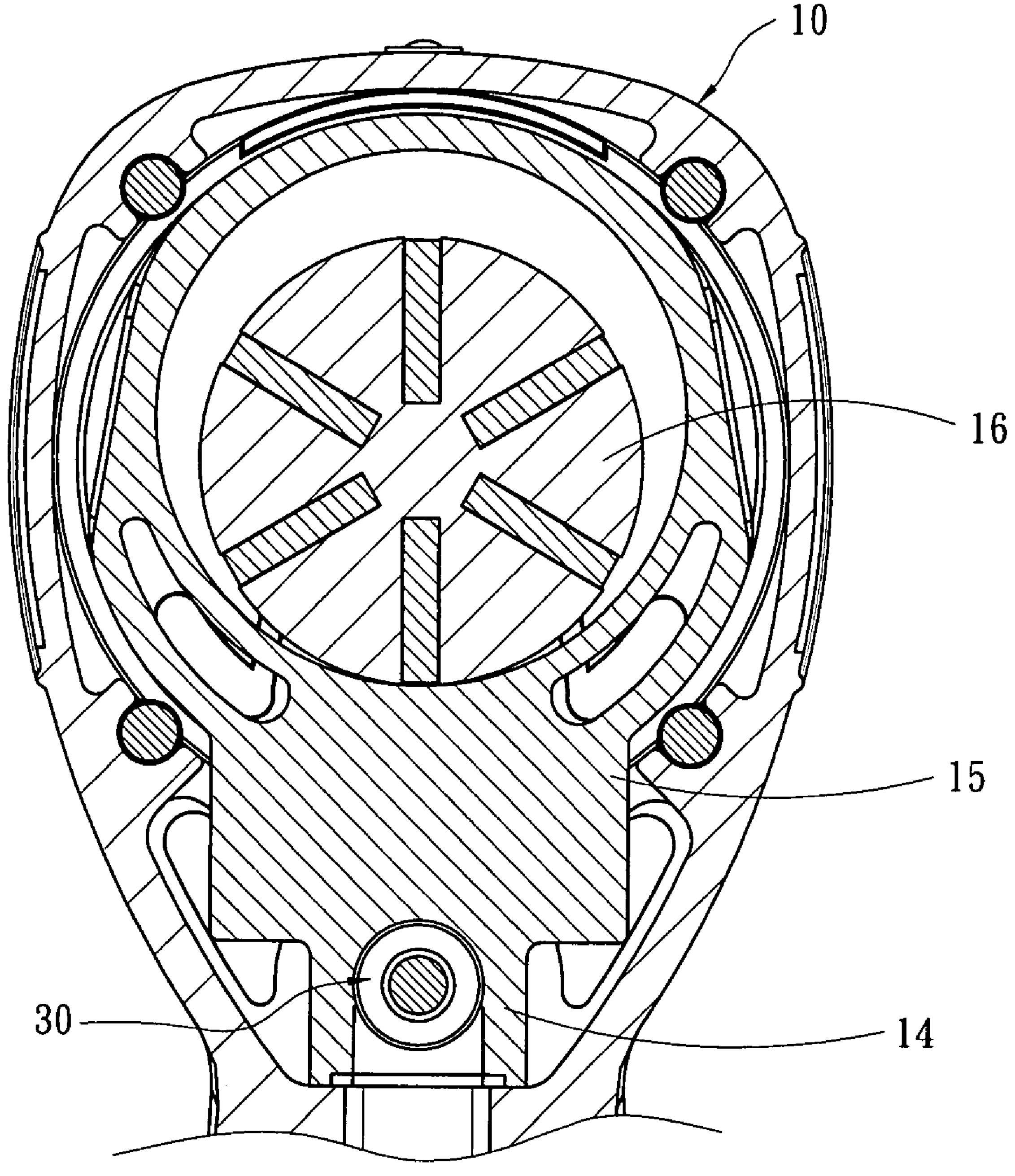
FIG. 4 is a cross section of the valve bushing and cylinder of an embodiment of the invention.

Refer to FIG. 4 for a partial section view of the invention. The pneumatic tool 10 usually has a plastic housing nowadays. As the valve bushing 14 made of metal cannot form a matching accurately with plastic material, the valve bushing 14 cannot be installed in the pneumatic tool 10 by insertion through forceful compression. According to the invention, the valve bushing 14 is located below the cylinder 15 and formed integrally with the cylinder 15, thus it can prevent the fastening element being loosen caused by vibration generated during operation. The possibility of leaking compressed air through the loosening spot that might otherwise occur can also be eliminated. In addition, the molding cost for the valve bushing 14 and cylinder 15 can be reduced because no separated molds are needed and the extra cost for adding a screw to fasten the valve bushing 14 on the cylinder 15 may also be saved. Fabrication time and cost for anchoring and assembling the valve bushing 14 and the cylinder 15 also decrease. As a result, product competitiveness can be enhanced. The present invention is especially suitable for the pneumatic tool 10 that commonly has a housing made of plastic material at present.

In short, the cylinder 15 and the valve bushing 14 of the invention are formed in an integrated manner. The valve bushing 14 is located below the cylinder 15 and holds the control bar 30 inside. Aside from controlling the positive and reverse rotation of the pneumatic tool 10, it also improves operation convenience of the pneumatic tool 10. Users can operate single-handed to start, stop (by depressing the trigger 19) or regulate (by pushing the control bar 30) the pneumatic tool 10 in positive or reverse rotations when holding the pneumatic tool 10. The design of integrating the cylinder 15 and the valve bushing 14 into one piece is especially suitable for the pneumatic tool 10 with a plastic housing.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. pneumatic tool, comprising:

a plastic housing;

a handle;

an inlet located at a lower end of the handle to receive compressed air from outside;

a cylinder;

an air intake passage located between the air inlet and the cylinder;

an air flow control structure having a valve bushing and a control bar;

the valve bushing being connected to the air intake passage, the valve bushing connecting to a first air intake flow path and a second intake flow path;

the first intake flow path and the second air intake flow path connecting with the cylinder and being respectively the air flow paths of positive and reverse rotation for the cylinder;

said control bar being located inside the valve bushing and being movable to selectively change rotation of a rotor in the cylinder in a positive direction or reverse direction;

the valve bushing being located at a lower side of the cylinder to hold the control bar, the valve bushing and the cylinder being formed integrally in one piece;

the control bar having an interceptor and a first air passing channel and a second air passing channel at two sides of the interceptor, the control bar being movable forward or backward in the valve bushing to a first position where the air intake passage is coupled with the first air passing channel and the first air intake flow path and to a second position where the air intake passage is coupled to the second air passing channel and the second air intake flow path.

2. The pneumatic tool of claim 1, wherein the valve bushing has a plurality of vents connecting respectively to the air intake passage, the first air intake flow path and the second air intake flow path.

3. The pneumatic tool of claim 1, wherein the valve bushing and the control bar are located below the cylinder and parallel with the cylinder.

* * * * *